March 21, 1972 K. LERTES 3,650,929

OXIDIZING METHOD AND APPARATUS

Filed Aug. 14, 1964

Inventor:
Kurt Lertes
By: Spencer & Kaye
ATTORNEYS 3,650,929

OXIDIZING METHOD AND APPARATUS

Kurt Lertes, Offenbach am Main, Germany, assignor to Licentia Patent-Verwaltungs-GmbH, Frankfurt am Main, Germany Filed Aug. 14, 1964, Ser. No. 389,535
Claims priority, application Germany, Aug. 16, 1963, L 35,231, L 45,616
Int. Cl. B01k *1/00;* H01k *3/12*
U.S. Cl. 204—164 1 Claim

ABSTRACT OF THE DISCLOSURE

A method and apparatus for oxidizing the surface of a silicon semiconductor body having at least one diffused pn-junction. The method comprises the step of treating or bombarding the surface of a semiconductor body with oxygen ions in the region to be oxidized. The oxygen ions are produced in a continuous gas discharge created by apparatus which comprises a closed discharge chamber, two silicon electrodes extending into the chamber and connected to a source which creates a potential difference between them, and oxygen inlet and outlet means attached to the chamber which cause a stream of oxygen to flow through the chamber under a controlled low pressure. The silicon semiconductor body is arranged within the chamber in such a way that the oxygen ions, produced in the discharge, impinge on the surface to be oxidized.

The present invention relates to a method of oxidizing silicon or a semiconductor arrangement having one or more pn-junctions, as well as to an apparatus wherein such a method can be carried out.

The oxidation of silicon is of considerable importance in the semiconductor art because, in the manufacture of planar systems, the silicon surface has to be coated with a uniform and impervious oxide layer. Furthermore, semiconductor elements made of a silicon base are stabilized and protected by an oxide layer which is provided in those regions where the pn-junctions reach to the surface of the semiconductor element.

It is already known to oxidize silicon thermally, with the oxidation taking place in dry or moist oxygen at temperatures of over 1000° C., or at lower temperatures if the oxygen is under elevated pressure. The thermal oxidation of silicon has a number of inherent drawbacks, one of these being that, as a result of the high operating temperatures, not only oxygen but also impurities found, for example, at the surface of the part to be oxidized will diffuse into the semiconductor. As a result, a pn-junction produced by such a process will have an inferior characteristic.

There also exists a method in which silicon is oxidized by means of an anode, this process making use of a suitable electrolyte. This process, too, has a number of inherent drawbacks. For one thing, there is a definite limit to the thickness which the oxide layer can attain. Furthermore, experience has shown that it is simply not possible, by means of this process, to form an oxide coating having the necessary imperviousness throughout, especially if the coating is applied to anything other than a very small surface, so that the process in question cannot be reliably used for larger silicon discs. Finally, considerable difficulties are encountered if the silicon semiconductor arrangement to be oxidized anodically has more than one pn-junction.

It is, therefore, the primary object of the present invention to provide an improved method of applying an oxide layer to silicon, or to a semiconductor arrangement having one or more pn-junctions, and, with this object in view, the present invention resides in an oxidizing method wherein the oxidation is effected by means of oxygen ions.

The present invention further resides in the provision of an apparatus wherein the oxidation by oxygen ions can be effected.

Figure 1A:
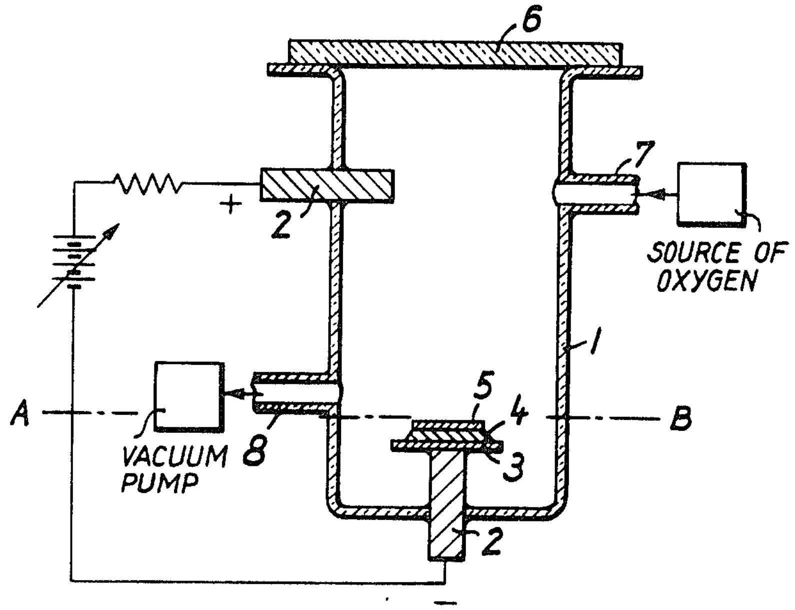
Figure 1B:
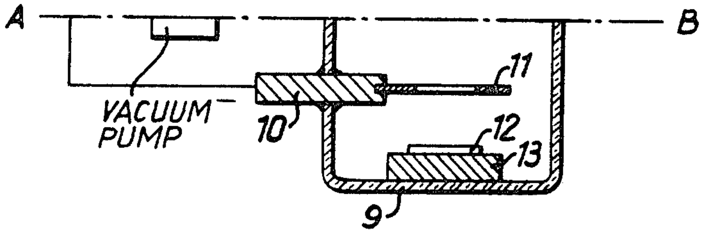

Additional objects and advantages of the present invention will become apparent upon consideration of the following description when taken in conjunction with the accompanying drawings in which: the FIG. 1*a* is a diagrammatic illustration of an apparatus suitable for carrying out a process according to the present invention and FIG. 1*b* gives a variation in the arrangement of FIG. 1*a* by which the purpose of the present invention may be achieved.

Referring now to the drawing, in particular, to FIG. 1*a*, the same shows an apparatus by means of which silicon discs and diffused pn-junctions can be oxidized. The apparatus comprises a vacuum-tight glass envelope 1 forming a chamber into which extend, also vacuum-tightly, two current lead-in electrodes 2, the same being made of silicon in order to prevent impurities in the form of metal atoms from attacking the silicon surface to be oxidized. In the figure, the semiconductor device 4 to be oxidized is, by way of example, constituted by a diffused pn-junction, i.e., a semiconductor device having consecutive p and n layers, the pn-junction coming to the surface of the slab at the beveled edge. The semiconductor device is shown to lie on a silicon disc 3 and is covered at its upper surface by means of a further disc 5, so that only the beveled edge of the device is free. The envelope 1 is sealed, at the top, by means of a glass disc 6, there being the usual grease-type seal between the envelope 1 and the closure disc 6.

The envelope 1 is provided with an inlet conduit 7 which is connected to a suitable supply of oxygen and an outlet conduit 8 connected to a vacuum pump, so that the oxygen is supplied in a flowing stream, in consequence of which foreign matter liberated during gas discharge is carried away. The inflow and outflow of the oxygen stream are regulated, thereby to adjust the pressure within the envelope 1. Also shown is an adjustable direct current voltage source connected across the lead-in electrodes 2. Instead of a direct current voltage source an alternating current source may be used.

FIG. 16 shows a variation of this arrangement whereby ions from a gaseous discharge are sent through one or more perforations in the cathode of the discharge (so-called canal rays) which are made to impinge on the object to be oxidized. The part of the apparatus above the line AB corresponds to the upper part of FIG. 1*a*. Into the envelope 9 the second electrode 10, made again of silicon, to which a perforated silicon plate 11 is attached. The object to be oxidized 12 is disposed on a pedestal 13, consisting of glass. As regards oxygen supply and pressure regulation the same provisions are made in the embodiment of the invention according to FIG. 1*a*.

As an example the oxidizing process employing a direct current discharge according to FIG. 1*a* for the oxidation of silicon discs containing diffused pn-junctions is discribed in detail in the following. The oxidation is carried out in two phases. First, a voltage is applied across the electrodes 2 and the discharge current is regulated by adjusting the pressure, the discharge current being kept constant throughout a given time interval. Then, the voltage is increased and, by adjusting the pressure, the discharge current is brought to a predetermined value. This phase of the step is continued for a given period of time, at the end of which the edge of the semiconductor device is covered with an oxide layer of the desired thickness.

It will be seen from the above the oxide layer is formed by causing oxygen ions to be "shot" against, i.e., to impinge upon the surface of the silicon, these ions being produced, in the above-described process, by a gaseous discharge. The ion beam causes only a spatially limited portion of the silicon surface to be heated, so that no diffusion processes take place below the oxide layer.

If desired, the same apparatus may be to clean the surface of the silicon prior to its being oxidized; this can be done by directing against the surface a stream of ions of an inert gas, such as argon. It has been found, however, that such a cleaning action is already obtained by directing against the surface the stream of oxygen ions which brings about the oxidation.

The following is an illustrative and not limitative example of the process:

The pressure in the gas discharge space is maintained between about 1 and 3 torr (1 torr=1 mm. Hg), and the applied voltage is 500 v. By regulating the pressure, a discharge current of about 2 ma. is obtained. The first phase of the oxidation is then carried out under these conditions for approximately 1 hour. During the second phase, the applied voltage is between 500 and 600 v., and, by suitably regulating the pressure, the discharge current is kept, for approximately another hour, to about 10 ma. There will then be obtained a complete, impervious oxide layer having a thickness of approximately 0.2$\mu$.

Silicon discs or pn-junctions which are provided with an oxide coating in accordance with the present invention are particularly insensitive not only to the usual ambient conditions but also to aggressive substances. It has also been found that the characteristics of the pn-junction are as good after the oxidation according to the present invention as before.

If the article being oxidized has a diffused pnp-junction, of the type used, for example, as a controllable rectifier, the surface break-through is, advantageously, shitfed toward higher voltages than the volume break-through.

It will be seen from the above, then, that the present invention not only overcomes the drawbacks of the prior art processes, but produces additional advantages which are not attained by the prior art processes.

Instead of creating the ions by a direct current gaseous discharge, as described in detail in the preceding paragraphs, they may be produced in any other suitable manner, such as by alternating current discharge, by an electrodeless high-frequency discharge, or by so-called canal rays, in which latter case the oxidation takes place outside of the main discharge in which the oxygen ions are produced.

It will be understood that the above description of the present invention is susceptible to various modifications, changes and adaptations, and the same are intended to be comprehended within the meaning and range of equivalents of the appended claim.

What is claimed is:

1. Surface oxidation of a silicon semiconductor body having at least one pn-junction, characterized by causing oxygen ions, produced in an oxygen stream by electrical discharge and formed by canal rays, to impinge upon a surface of the semiconductor body outside of the main discharge within which the oxygen ions are produced; the oxidation being effected under an applied voltage and pressure sufficient to obtain an oxide layer on the semiconductor body surface.

References Cited

UNITED STATES PATENTS

| | | | |
|---|---|---|---|
| 2,750,544 | 6/1956 | Pfanir | 204—164 |
| 3,226,611 | 12/1965 | Haenichen | 148—33.3 |
| 3,243,174 | 3/1966 | Sweet | 266—24 |
| 3,337,438 | 8/1967 | Gobeli et al. | 204—164 |

F. C. EDMUNDSON, Primary Examiner

U.S. Cl. X.R.

204—323